(12) United States Patent
Lisimaque et al.

(10) Patent No.: US 6,666,382 B2
(45) Date of Patent: Dec. 23, 2003

(54) PLUG-IN REMOVABLE CARD, FORMING A CHIP CARD READER FOR A MICRO-COMPUTER

(76) Inventors: Gilles Lisimaque, 1508 Blue Meadow Rd., Potomac, MD (US) 20854; Jerome Monnot, Quartier Coulin, Gemenos 13420 (FR)

( * ) Notice: Subject to any disclaimer, the term of this patent is extended or adjusted under 35 U.S.C. 154(b) by 151 days.

(21) Appl. No.: 09/837,524

(22) Filed: Apr. 18, 2001

(65) Prior Publication Data

US 2003/0106941 A1 Jun. 12, 2003

Related U.S. Application Data

(63) Continuation of application No. 09/077,695, filed as application No. PCT/FR96/01913 on Dec. 2, 1996, now abandoned.

(30) Foreign Application Priority Data

Nov. 30, 1995 (FR) .............................................. 9514852

(51) Int. Cl.[7] ................................................ G06K 19/06
(52) U.S. Cl. ....................................... 235/492; 235/441
(58) Field of Search .................................. 439/374, 375; 235/485, 484, 475

(56) References Cited

U.S. PATENT DOCUMENTS

| 3,777,120 | A | * | 12/1973 | Menger et al. | ............. | 235/483 |
| 5,336,877 | A | * | 8/1994 | Raab et al. | ................. | 235/475 |
| 5,375,037 | A | * | 12/1994 | Le Roux | ..................... | 361/684 |
| 5,674,080 | A | * | 10/1997 | Takemura | ................... | 439/159 |
| 5,850,103 | A | * | 12/1998 | Takemura | ................... | 257/679 |
| 6,394,827 | B2 | * | 5/2002 | Nogami | ..................... | 439/159 |

* cited by examiner

Primary Examiner—Michael G. Lee
Assistant Examiner—Kimberly Nguyen
(74) Attorney, Agent, or Firm—Roland Plottel

(57) ABSTRACT

Releasable PCMCIA cards (10) suitable for plugging into the slot (12) of a micro-computer (14). To enable the releasable plug-in card (10) to be used as a smart card reader, it is altered in such a way that it can receive a smart card (22). For this purpose, the releasable card (10) includes a guide system (15) with a shape matching that of a smart card (22) so that the smart card is properly positioned relative to the reader. A micro-computer or PCMCIA card may thus be protected by means of a security smart card.

13 Claims, 3 Drawing Sheets

PLUG-IN REMOVABLE CARD, FORMING A CHIP CARD READER FOR A MICRO-COMPUTER

CROSS-REFERENCE TO RELATED APPLICATION

This application is a continuation of application Ser. No. 09/077,695, filed Sep. 18, 1998, now abandoned which is a 371 of PCT/FR96/01913 filed Dec. 2, 1996.

BACKGROUND OF THE INVENTION

The invention relates to plug-in removable cards intended to be temporarily inserted into a micro-computer (or personal computer or PC) or into information processing devices in general.

These cards are generally known under the name PCM-CIA cards and are produced in accordance with the PCM-CIA Standard defined by the association of the same name ("Personal Computer Memory Card International Association" 1030 B East Duane Avenue, Sunnyvale, Calif.). They comprise several chips with integrated circuits and a 68 pin female connector that can be plugged into a corresponding male connector on the micro-computer. These cards are mainly bulk memory cards which could in the future replace diskettes and other magnetic type means of bulk storage. They have equivalent storage capacities and offer much more rapid access than magnetic memories. They can also be used as an extension to the random access memory of the micro-computer.

It has already been proposed, in the patent application FR No. 92 00323 filed by the applicant and published under the number U.S. Pat. No. 2,686,171, that PCMCIA cards be modified to convert them into readers of chip cards with flush contacts such as credit cards or access cards of a format now very common among the general public. Hence a micro-computer fitted with a PCMCIA reception slot can receive a chip card with flush contacts even if it is not fitted with a slot for reading such chip cards. The chip card is coupled to the PCMCIA and electrically connected to it; the two cards are introduced into the micro-computer and the exchanges between the chip card and the micro-computer only occur through the intermediary use of the plug-in connector of the PCMCIA card and the corresponding connector of the micro-computer.

This allows for example the computer or any other information processing system to communicate with the chip card with flush contacts even if it is not fitted with a reader of cards with flush contacts, the access to the computer to be protected by a security chip card the access to the PCMCIA card to be protected by a security chip card access to be permitted to a network protected by authentication that uses a chip card.

An improved system for the PCMCIA forming a chip card reader that has just been described, has also been proposed in the patent application FR No. 95 06723 filed by the applicant. For this, the smart card comprises two plates, approximately the same length and integral one to the other in the part situated to the side of the plug-in connector forming an insertion slot for the chip card from the opposite side.

The second plate allows the provision of a firm hold of the flush contacts of the chip card against a contact connector placed on the first plate of its reader. The width of the removable card is approximately the same as that of the chip card. The slot defined by the two plates is not demarcated laterally since its side edges are open in such a way that the removable card remains in conformity with the overall dimensions of a card corresponding to the PCMCIA Standard.

In these two patent applications, the basic principle for the lateral positioning of the chip card, is in the utilisation of the side edges of the slot of the micro-computer, which allow guidance of both the removable card forming the reader and the chip card. In effect, to the extent that the theoretical dimensions of the PCMCIA card are identical to those of the chip card, it is possible to rely on the width of the housing made in the micro-computer to guide the chip card and to ensure its correct positioning on the removable card.

SUMMARY OF THE INVENTION

However the applicant is aware that using the side edges of the slot in the micro-computer to guide the chip card so as to ensure its correct positioning generates another quite unexpected problem. In effect, it has become apparent today that numerous micro-computers or other information processing systems do not keep to the dimensions imposed by the PCMCIA Standard and that the actual tolerances on the width of the slot are very variable from one product to another or from one category of products (personal computer, digital television decoder, etc . . . ) to another. The utilisation of the side edges of the slot of the micro-computer to position the chip card in a precise manner onto the removable card forming the chip card reader is therefore no longer possible. The chip card being inadequately guided, even a small off-set of the chip card in relation to the PCMCIA card is enough to cause a malfunction or a breaking off of the reading operation.

A first solution that can be envisaged for positioning the chip card in a precise manner on its reader consists of creating lateral braces along the plug-in removable chip in such a way as to produce runners on which the chip card would slide.

This solution is not appropriate however. In effect, since the width of a PCMCIA card is similar to that of a chip card, produced in the usual format for chip cards in accordance with the Standard ISO 7816-1 and ISO 7816-2 and since the lateral braces have a thickness that is sufficient to reduce in a significant way the width of the removable plug-in card, it becomes impossible to run the chip card in without modifying the width of the removable card. If the width of the removable plug-in card is modified, its dimensions will no longer correspond to the requirements of the PCMCIA Standard.

Consequently, the problem which is posed consists of looking for a means that permits the chip card to be guided and positioned in a precise way on the PCMCIA card without modifying the dimensions of the latter.

This invention permits resolution of this problem. In effect, it provides a removable plug-in card for a micro-computer that includes an external plug-in connector and a flush contacts connector capable of creating an electrical connection with the flush contacts of a chip card in order to form a chip card reader, characterised in that it includes, a guidance system the shape of which combines with that of the chip card so as to ensure the correct positioning of the latter in relation to the internal connector.

BRIEF DESCRIPTION OF THE DRAWINGS

Other characteristics and advantages of this invention will become apparent on reading the description made as an illustrative example and being non-limitative and which makes reference to the appended drawings which represent.

DESCRIPTION OF THE PREFERRED EMBODIMENT

Figure 1:
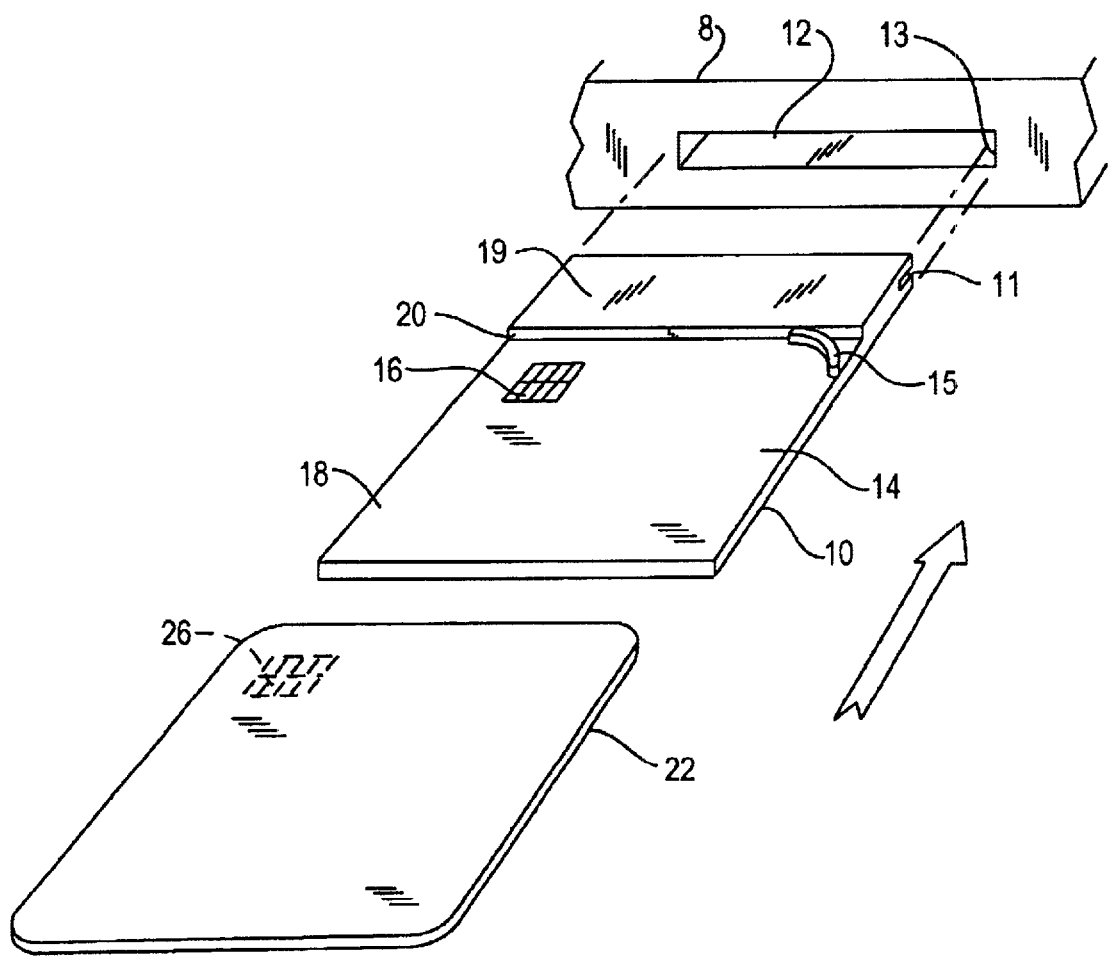
FIG. 1, a general perspective view of a PCMCIA card according to the invention.

The removable card with plug-in connector according to the invention is designated with the general reference number 10. It can be inserted into a slot 12, in a micro-computer 14. In principle, the card 10 includes an external female 68 pin connector 11 which can penetrate to the bottom of the slot 12, which is fitted with a corresponding 68 pin male connector. This male connector constitutes a parallel input/output port for the micro-computer and the communication between the card 10 and the micro-computer is a parallel type communication.

In the embodiment example shown, the card 10 includes one or more integrated circuit chips, embedded in the plastic material constituting the body of the card, as well as connections between these chips, and connections from the chips to the various pins of the external plug-in connector. The chips can be ROM or EPROM or EEPROM memory chips, for example in the case where the chip constitutes a bulk memory for the micro-computer. But the card can have other functions and for example may include a micro-processor etc. Typically, the dimensions of the card 10, according to the PCMCIA Standard, are about 5.4 centimeters by 8.5 centimeters with a thickness of about 3 to 5 millimeters, In other embodiment examples not illustrated, the PCMCIA card 10 can have the general shape of a parallelepiped case, provided with a slot for the introduction of a chip card, and open lateral sides that allow the sharp side edges of an inserted chip card to be apparent.

In this case, the flush contacts of the PCMCIA card connector are arranged on the inside of the case, in such a way that they can co-operate with the flush contacts of an inserted chip card. In such an embodiment, this invention nevertheless finds application since the sharp side edges of the chip card are not well guided by the PCMCIA card case. Although the description below relates to the type of PCMCIA card shown, it is nevertheless understood that the invention is applicable to other types of cards notably those in the form of a case which do not have adequate guidance for the inserted chip card.

In the embodiment shown, the card 10 includes, in addition, for example on its main face 14, a connector 16 with contacts that are flush and slightly projecting in relation to the plane of the card. This connector 16 is designed and positioned in such a way that it can come into contact with the different flush contacts 26 of a chip card 22, of the credit card type for example, when such a card is put into place on the PCMCIA card 10.

Preferably, the end 19 of the memory card 10, situated at the side of the external connector 11, that is to say on the same side as that which is inserted into the slot 12, is thicker than the rest of the card. A credit card 22 can thus come into abutment against an edge 20 separating the thicker part 19 from the less thick part 18; this edge 20 is parallel to the short edges of the card 10.

The connector 16, with flush contacts, of the removable card 10, is linked either directly to the chips of this card, or to the plug-in external connector 11 of this card, or to both the chips and the external connector, according to the application.

The chip card 22 can have an access security function either to control and authorise the use of the micro-computer, or to control access to the memories of the plug-in card 10, notably in the case where this is being used as a bulk memory or a modem and contains (or allows access to) confidential information or programs for the micro-computer.

The removable card 10 and the chip card 22 are represented outside the slot 12 of the computer 14. They are inserted one after the other into the slot in the direction of the arrow as shown in FIG. 1. The width of a PCMCIA card is similar to that of a chip card made in the standard format for chip cards. Generally, the lateral positioning of the chip card 22 on to or into the PCMCIA card 10 is achieved using the lateral edges 13 of the slot 12 of the micro-computer 14. In effect, the slot 12 is made in a width sufficiently narrow to allow these lateral edges 13 to be used as guides both during insertion of the removable card 10 and during insertion of the chip card 22. Hence, the guides formed by the lateral edges 13 of the slot 12 permit correct positioning of the chip card 22 on the card 10, in such a way that its flush contacts 26 establish an electrical connection with the contacts of the connector 16 of the removable card 10.

However, it is apparent that numerous micro-computers or other information processing systems do not keep to the dimensions imposed by the PCMCIA Standard and the width of the slot 12 is often greater than the width normally to be expected and varies from one micro-computer to another. Consequently, the lateral edges 13 of the slot 12 can no longer be used as guides.

According to the invention, the plug-in card 10 forming a chip card reader, comprises, in addition, a guidance system 15, the form of which combines with that of a chip card 22 with flush contacts. This guidance system permits the provision of correct lateral positioning of the chip card 22, that is to say perpendicular to the direction of insertion of the chip card, in relation to the internal connector 16 of the PCMCIA card 10. Furthermore, it allows one to avoid modification of the dimensions of the removable card 10, which are imposed by the PCMCIA Standard. For this, the guidance system 15 includes at least one stop placed, at the side of the external connector 11 of the card 10, in such a way as to be able to co-operate with at least one angle of the chip card during its positioning on or in the removable card 10. Each stop is placed, for example, in one of the angles of the card situated between the thicker part 19, the edge 20 and the less thick part 18. In the embodiment shown, the stop 15 is fixed on the main face 14 of the card 10 by sticking or moulding or as a detachable element for example. Furthermore it is made of the same material as the card 10, that is to say, plastic. However according to one embodiment variation, it can also be produced in a metallic material.

Hence, since the guidance system 15 is produced in an angle of the card 10 and on the same side as that which is inserted into the bottom of the slot 12, it allows the chip card 22 to be guided during the final phase of its insertion so as to provide it with a very precise positioning in relation to the connector 16 of the removable card 10.

The thickness of the guide 15 is preferably equal to that of the edge 20 separating the thicker part 19 from the less thick part 18 of the removable card 10, and in all cases, this thickness does not exceed the height of the slot, of the micro-computer, into which the two cards are inserted.

Figure 2:
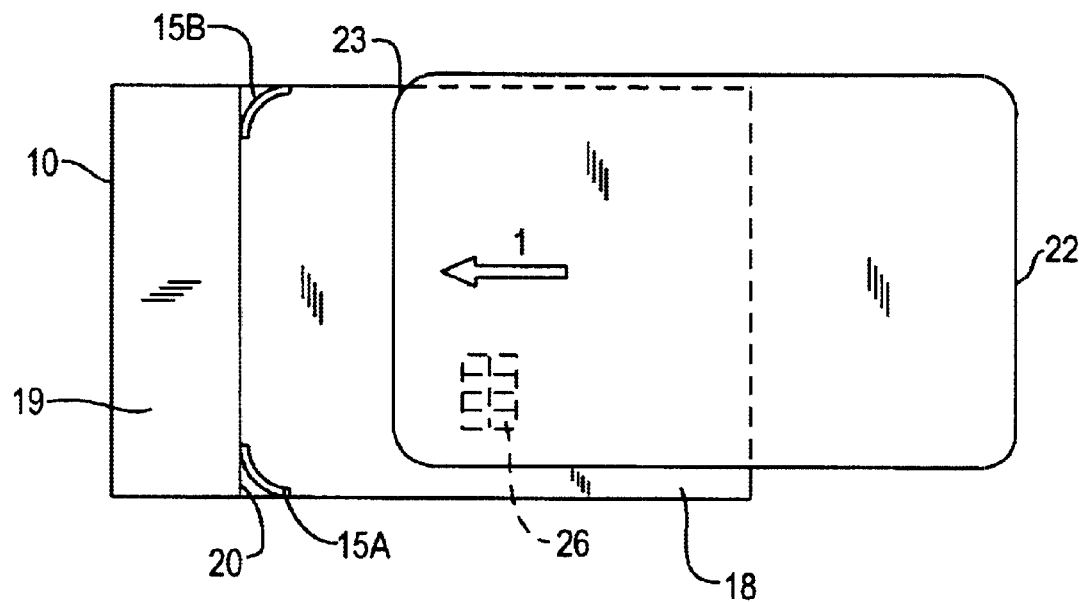
FIG. 2, a view from above of one embodiment of a PCMCIA card according to the invention, with a chip card in the course of insertion, FIG. 3, a view from above of another embodiment of a PCMCIA card according to the invention, with a chip card inserted, FIG. 4, a view from above of another embodiment of a PCMCIA card according to the invention, with a chip card inserted.

FIG. 2 represents a view from above of the removable card of FIG. 1, and a chip card 22 in the course of being positioned onto this removable card 10. Each of the angles of the chip card 22, of the credit card type for example, have, conforming to the Standards ISO 7816-1 and ISO 7816-2, a slight rounding off 23, which is represented in an exaggerated way in FIG. 2 to make it clearer. In an advantageous way, the guidance of the chip card 22 in the final phase of its insertion is achieved by making use of this rounding off 23.

Preferably, the guidance system 15 represented in FIG. 2 has two stops 15A and 15B, situated on each side of the plug-in connector and against the edge 20 separating the thicker part 19 from the less thick part 18 of the removable card 10.

The added thickness of the removable card 10 and the chip card 22 is approximately equal to that of the thicker part 19 of the card, but this cumulative thickness does not exceed the height of the slot of the micro-computer into which the two cards are inserted.

In an advantageous way, the stops 15A and 15B have a rounded off shape. In FIG. 2, the direction of the positioning of the card 22 is represented by an arrow designated with reference number 1. The card 22 is represented in the course of the final phase of its positioning and in such a way that it is slightly offset in relation to the longitudinal edges of the smart card 10. In this case, during the final phase of its insertion, one of the angles 23 of the card 22 comes up against one of the stops of the guidance system 15, for example the stop 15B in FIG. 2. The rounded angle 23 of the card 22 is then guided and follows the curve of the guide 15B until the end of the card 22 comes up against the edge 20 of the removable card 10, that is to say until the chip card is positioned in a precise manner between the two guides 15A and 15B. Hence, the flush contacts 26 of the chip card 22, shown in dotted line in FIG. 2 are positioned opposite the contacts of the connector 16, not visible in FIG. 2, of the removable card 10.

Preferably, the radius of curvature of the stops 15A and 15B is identical or close to that of the angles 23 of the chip card 22, in such a way that they marry up perfectly with the shape of the curves of the chip card.

Figure 3:
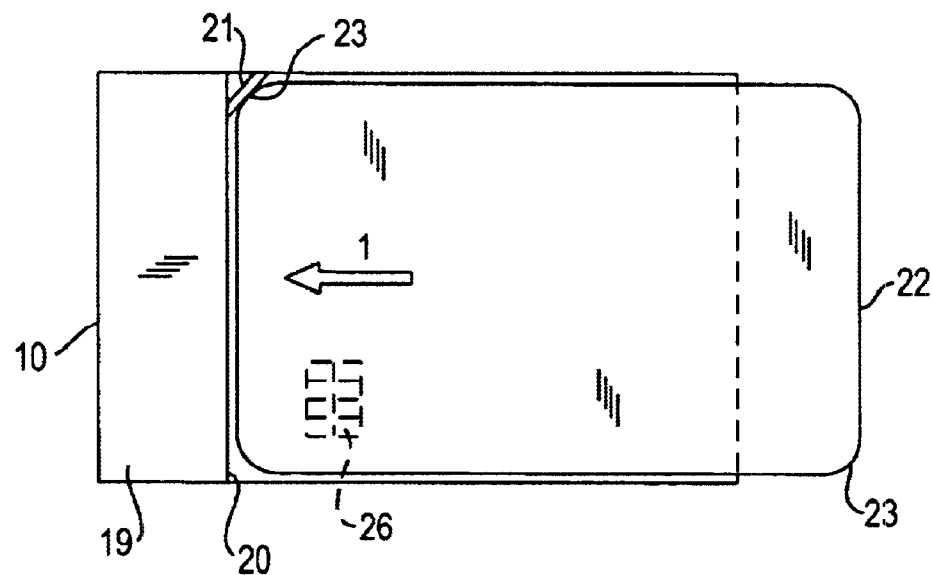

FIG. 3 also shows a chip card 22 positioned on a plug-in removable card 10 according to another embodiment of the invention. The angles 23 of the chip card 22 are shown in an exaggerated way in FIG. 3. The guidance system 21 of the removable card 10 includes a single stop, but as has been previously described, it can include a second one. The stop 21 is also fixed, by sticking for example, on the side of the external plug-in connector, in an angle situated between the thick part 19, the edge 20 and the less thick part 18 of the removable card 10. In an advantageous way, this stop 21 is rectilinear and is in the form of a guide ramp. This ramp forms an obtuse angle with the edge 20 of the card 10. In the same way as previously described, the card 22 is inserted in the direction shown by the arrow designated with reference number 1. When the rounded off angle 23 of the card 22 comes up against the stop 21, the card 22 pressed against this stop, is guided along the ramp until its end is positioned against the edge 20 of the PCMCIA card 10. Hence, this guidance system 21 also permits very precise positioning of the chip card 22 on the PCMCIA card 10.

Figure 4:
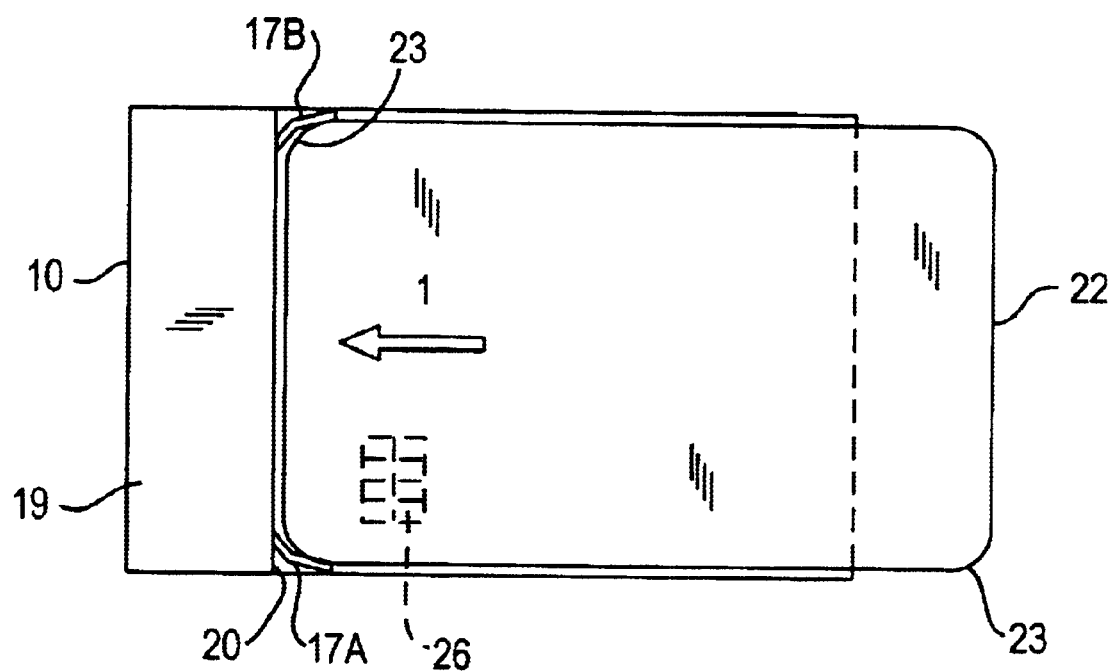

FIG. 4 represents another embodiment of a removable card 10 according to the invention and a chip card 22 correctly positioned on it. To facilitate understanding, the angles 23 of the chip card 22 and the guidance system 17 are shown in an exaggerated manner in FIG. 3. As previously described, the guidance system 17, on this removable card 10, includes one or two stops. In FIG. 4, the guidance system shown has two stops 17A and 17B, situated on the side of the plug-in external connector and against the edge 20. In an advantageous manner, these two stops 17A and 17B each comprise two guide ramps, formed by two rectilinear branches and have an angular shape. In an advantageous manner, the angle formed between these two guide ramps is obtuse. In the same way as previously described, the card 22 is inserted in the direction represented by the arrow 1. When a rounded off angle 23 of the card 22 comes up against one of the stops, for example stop 17B, then the card successively follows the two ramps of this stop in such a way that it is guided towards the inside of the space defined by the lateral edges of the PCMCIA card 10 and by the guides 17A and 17B. The insertion of card 22 comes to an end when its end is positioned pressing against the edge 20 of the PCMCIA card. In this case, the card 22 is positioned in a very precise manner and its flush contacts 26, shown in dotted lines in FIG. 3, are electrically connected to the flush contacts of the connector 16, not visible in FIG. 3, of the removable card 10.

In an advantageous manner, the size of the angle formed between the ramps of each stop 17A and 17B or between the ramp of stop 21 and the edge 20 of the card 10, is between 100° and 150°. Preferably it is between 115° and 135°.

What is claimed is:

1. A device, comprising a removable plug-in card (10) for a computer, said card having a first external plug-in connector (11) and a second external connector (16) with flush contacts, a chip card (22) having flush contacts (26), said two cards when positioned adjacent one another have their flush contacts touching whereby creating an electrical connection between the second flush contacts (16, 26) of the plug-in card and the flush contacts of the chip card (22), a fixed mechanical positioning means (15, 17, 21) fixedly mounted on the removable plug-in card which cooperates with the adjacent chip card (22) for ensuring correct lateral positioning of the chip card in relation to said plug-in card, so that said flush contacts (26) of said chip card are correctly positioned touching said flush contacts of said second connector (16), said first external plug-in connector making electrical contact with a computer contact when said plug-in card is connected in a computer, said positioning means comprises at least one stop (17A, 17B; 21) placed at a side of the removable plug-in card to co-operate with at least one corner edge of the chip card during said chip card's positioning on the plug-in removable card (10), said plug-in card comprises a thick part (19) situated at the side of the first external connector (ii) and a parallel less thick part (18) defined by the rest of the card (10), and an edge (20) therebetween and perpendicular thereto the fixed positioning means (17, 21) includes one or two stops (17A, 17B; 21) placed on the less thick part (18) in an angle or angles situated between the thick part (19), the edge (20) and the less thick part (18).

2. A device according to claim 1 wherein the stop (17A,) includes a first ramp adjacent to the edge and a second ramp extending from the first ramp.

3. A device according to claim 2, characterized in that the angle formed between the two ramps of the stop (17A, 17B) is obtuse.

4. The device according to claim 3 wherein the size of the angle formed between the two ramps of the stop is between 100 degrees and 150 degrees.

5. The device according to claim 4 wherein said angle is between 115 degrees and 135 degrees.

6. A computer memory and access card system comprising a memory card and a separate access card, both to be inserted into a card reader, said access card having circuitry to verify access to the cards, and a first set of electrical contacts, said memory card having memory, a first set of contacts located to make electrical contact with said first set of contacts of the access card when both cards are positioned in a card reader, and a second set of contacts to make contact with said card reader, said memory card has a maximum thickness and a portion of its main face of reduced thickness, said access card has a thickness, which is approximately equal to the difference between said maximum thickness and said reduced thickness, and lateral dimensions to fit in said portion of said memory card, so that when said two cards when so superimposed with said access card in said portion of said memory card and with said first sets of contacts together have an overall dimension to fit into and be accepted by said reader, the improvement consisting of a guidance system having two stops located on the main face of the reduced thickness of the memory card towards the sides thereof at set portion of said memory card where said reduced thickness ends and said maximum thickness commences, said two stops (17A and 17B) each comprise two guide ramps formed by two rectilinear branches and have an angular shape.

7. The system according to claim 6 wherein an angle formed between these two guide ramps is obtuse.

8. The system according to claim 7 wherein the angle formed between the ramps of each stop is between 100 degrees and 150 degrees.

9. The system according to claim 8 wherein said angle between the ramps is between 115 degrees and 125 degrees.

10. A computer memory and access card system comprising a memory card and a separate access card, both adopted to be inserted into a card reader, said access card having circuitry to verify access to the cards, and a first set of electrical contacts, said memory card having memory, a first set of contacts located to make electrical contact with said first set of contacts of the access card when both cards are positioned in a card reader, and a second set of contacts to make contact with said card reader, said memory card has a maximum thickness and a portion of its main face of reduced thickness, said access card has a thickness, which is approximately equal to the difference between said maximum thickness and said reduced thickness, and lateral dimensions to fit in said portion of said memory card, so that when said two cards when so superimposed with said access card in said portion of said memory card and with said first sets of contacts together have an overall dimension to fit into and be accepted by said reader, the improvement consisting of a guidance system having two stops located on the main face of the reduced thickness of the memory card towards the sides thereof at said portion of said memory card where said reduced thickness ends and said maximum thickness commences, said two stops each comprise two guide ramps a substantially straight ramp shape (21) off set at an angle from a wall extending between said reduced thickness and said maximum thickness of said memory card.

11. The system according to claim 10 wherein the angle formed between the ramp and the wall is obtuse.

12. The system according to claim 11 wherein said angle is between 100 degrees and 150 degrees.

13. The system according to claim 12 wherein said angle is between 115 degrees and 125 degrees.

* * * * *